United States Patent
Capio

(10) Patent No.: US 8,447,421 B2
(45) Date of Patent: May 21, 2013

(54) TRAFFIC-BASED MEDIA SELECTION

(75) Inventor: Oliver R. Capio, Sunnyvale, CA (US)

(73) Assignee: Sony Computer Entertainment Inc., Tokyo (JP)

(*) Notice: Subject to any disclaimer, the term of this patent is extended or adjusted under 35 U.S.C. 154(b) by 1117 days.

(21) Appl. No.: 12/229,134

(22) Filed: Aug. 19, 2008

(65) Prior Publication Data

US 2010/0049344 A1 Feb. 25, 2010

(51) Int. Cl.
*G06F 17/00* (2006.01)

(52) U.S. Cl.
USPC .......................................................... 700/94

(58) Field of Classification Search
USPC ....................... 700/94; 345/1.1, 1.2
See application file for complete search history.

(56) References Cited

U.S. PATENT DOCUMENTS

| | | | |
|---|---|---|---|
| 3,409,877 A | 11/1968 | Alterman et al. |
| 3,436,734 A | 4/1969 | Pomerene et al. |
| 3,517,171 A | 6/1970 | Avizienis |
| 3,623,014 A | 11/1971 | Doelz et al. |
| 3,668,644 A | 6/1972 | Looschen |
| 4,485,457 A | 11/1984 | Balaska et al. |
| 4,587,640 A | 5/1986 | Saitoh |
| 4,752,068 A | 6/1988 | Endo |
| 4,858,930 A | 8/1989 | Sato |
| 5,014,982 A | 5/1991 | Okada et al. |
| 5,128,863 A | 7/1992 | Nakamura et al. |
| 5,222,134 A | 6/1993 | Waite et al. |
| 5,233,423 A | 8/1993 | Jernigan et al. |
| 5,273,294 A | 12/1993 | Amanai |
| 5,477,492 A | 12/1995 | Ohsaki et al. |
| 5,490,216 A | 2/1996 | Richardson, III |
| 5,523,551 A | 6/1996 | Scott |
| 5,532,735 A | 7/1996 | Blahut et al. |
| 5,636,277 A | 6/1997 | Nagahama |
| 5,729,214 A * | 3/1998 | Moore ........................ 340/905 |
| 5,794,217 A | 8/1998 | Allen |
| 5,809,145 A | 9/1998 | Slik et al. |
| 5,829,047 A | 10/1998 | Jacks et al. |
| 5,838,314 A | 11/1998 | Neel et al. |
| 5,892,900 A | 4/1999 | Ginter et al. |
| 5,913,040 A | 6/1999 | Rakavy et al. |
| 5,971,856 A | 10/1999 | Aoyama et al. |
| 6,066,182 A | 5/2000 | Wilde et al. |
| 6,070,141 A | 5/2000 | Houvener et al. |

(Continued)

FOREIGN PATENT DOCUMENTS

| EP | 0454340 | 10/1991 |
|---|---|---|
| EP | 0773490 | 5/1997 |

(Continued)

OTHER PUBLICATIONS

Mueller et al., "A Nested Transaction Mechanisum for Locus," Proceedings of the Ninth ACM Symposium on Operating System Principles (1983).

*Primary Examiner* — Andrew C Flanders
(74) *Attorney, Agent, or Firm* — Carr & Ferrell LLP

(57) ABSTRACT

Methods and systems for traffic-based media selection are provided. A first media file may be played on a media player. Traffic around the media player is monitored, and various traffic conditions, including speed and density of the traffic, may be detected. A second media file is selected based on a detected traffic condition and provided to the media player. In some embodiments of the present invention, the traffic may occur in a virtual environment.

17 Claims, 3 Drawing Sheets

U.S. PATENT DOCUMENTS

| | | | |
|---|---|---|---|
| 6,073,123 A | 6/2000 | Staley | |
| 6,081,785 A | 6/2000 | Oshima et al. | |
| 6,085,262 A | 7/2000 | Sawada | |
| 6,117,011 A | 9/2000 | Lvov | |
| 6,119,108 A | 9/2000 | Holmes et al. | |
| 6,135,646 A | 10/2000 | Kahn et al. | |
| 6,137,480 A | 10/2000 | Shintani | |
| 6,148,335 A | 11/2000 | Haggard et al. | |
| 6,189,146 B1 | 2/2001 | Misra et al. | |
| 6,195,432 B1 | 2/2001 | Takahashi et al. | |
| 6,201,771 B1 | 3/2001 | Otsuka et al. | |
| 6,243,796 B1 | 6/2001 | Otsuka | |
| 6,247,131 B1 | 6/2001 | Kotani et al. | |
| 6,260,141 B1 | 7/2001 | Park | |
| 6,311,209 B1 | 10/2001 | Olson et al. | |
| 6,314,451 B1 | 11/2001 | Landsman et al. | |
| 6,405,203 B1 | 6/2002 | Collart | |
| 6,434,535 B1 | 8/2002 | Kupka et al. | |
| 6,446,260 B1 | 9/2002 | Wilde et al. | |
| 6,463,078 B1 | 10/2002 | Engstrom et al. | |
| 6,470,085 B1 | 10/2002 | Uranaka et al. | |
| 6,529,453 B1 | 3/2003 | Otsuka et al. | |
| 6,560,640 B2 | 5/2003 | Smethers | |
| 6,594,740 B1 | 7/2003 | Fukuda | |
| 6,611,607 B1 | 8/2003 | Davis et al. | |
| 6,640,306 B1 | 10/2003 | Tone et al. | |
| 6,694,025 B1 | 2/2004 | Epstein et al. | |
| 6,731,940 B1 * | 5/2004 | Nagendran | 455/456.1 |
| 6,811,490 B2 | 11/2004 | Rubin | |
| 6,832,318 B1 | 12/2004 | Yaegashi et al. | |
| 6,920,565 B2 | 7/2005 | Isaacson et al. | |
| 7,071,914 B1 | 7/2006 | Marks | |
| 7,263,462 B2 | 8/2007 | Funge et al. | |
| 7,296,007 B1 | 11/2007 | Funge et al. | |
| 7,313,251 B2 | 12/2007 | Rhoads | |
| 7,363,384 B2 | 4/2008 | Chatani et al. | |
| 7,425,903 B2 | 9/2008 | Boss et al. | |
| 7,426,750 B2 | 9/2008 | Cooper et al. | |
| 7,440,431 B2 | 10/2008 | Sindhushayana et al. | |
| 7,466,241 B2 * | 12/2008 | Lyle et al. | 340/905 |
| 7,495,631 B2 * | 2/2009 | Bhakta et al. | 345/1.1 |
| 7,558,698 B2 | 7/2009 | Funge et al. | |
| 7,636,645 B1 | 12/2009 | Yen et al. | |
| 7,636,697 B1 | 12/2009 | Dobson et al. | |
| 7,636,701 B2 | 12/2009 | Funge et al. | |
| 2001/0020295 A1 | 9/2001 | Satoh | |
| 2001/0025256 A1 | 9/2001 | Oliphant et al. | |
| 2001/0034721 A1 | 10/2001 | Boudreau et al. | |
| 2001/0042021 A1 | 11/2001 | Matsuo et al. | |
| 2001/0051996 A1 | 12/2001 | Cooper et al. | |
| 2002/0016922 A1 | 2/2002 | Richards et al. | |
| 2002/0041692 A1 * | 4/2002 | Seto et al. | 381/86 |
| 2002/0052816 A1 | 5/2002 | Clenaghan et al. | |
| 2002/0077988 A1 | 6/2002 | Sasaki et al. | |
| 2002/0082997 A1 | 6/2002 | Kobata et al. | |
| 2002/0103855 A1 | 8/2002 | Chatani | |
| 2002/0104019 A1 | 8/2002 | Chatani et al. | |
| 2002/0116206 A1 | 8/2002 | Chatani | |
| 2002/0116283 A1 | 8/2002 | Chatani | |
| 2002/0129094 A1 | 9/2002 | Reisman | |
| 2002/0142845 A1 | 10/2002 | Whitten et al. | |
| 2002/0161709 A1 | 10/2002 | Floyd et al. | |
| 2003/0032486 A1 | 2/2003 | Elliott | |
| 2004/0264707 A1 * | 12/2004 | Yang et al. | 381/77 |
| 2006/0264259 A1 | 11/2006 | Zalewski et al. | |
| 2007/0015558 A1 | 1/2007 | Zalewski et al. | |
| 2007/0015559 A1 | 1/2007 | Zalewski et al. | |
| 2007/0021208 A1 | 1/2007 | Mao et al. | |
| 2007/0072676 A1 * | 3/2007 | Baluja | 463/42 |
| 2007/0168359 A1 | 7/2007 | Jacob et al. | |
| 2007/0243930 A1 | 10/2007 | Zalewski et al. | |
| 2007/0244751 A1 | 10/2007 | Zalewski et al. | |
| 2007/0255630 A1 | 11/2007 | Zalewski et al. | |
| 2007/0261077 A1 | 11/2007 | Zalewski et al. | |
| 2008/0024722 A1 | 1/2008 | Pollard | |
| 2008/0098448 A1 | 4/2008 | Mondesir et al. | |
| 2008/0253740 A1 | 10/2008 | Rhoads | |
| 2009/0221368 A1 | 9/2009 | Yen et al. | |
| 2009/0221374 A1 | 9/2009 | Yen et al. | |
| 2009/0288064 A1 | 11/2009 | Yen et al. | |
| 2010/0004896 A1 | 1/2010 | Yen et al. | |

FOREIGN PATENT DOCUMENTS

| | | |
|---|---|---|
| EP | 0795809 | 9/1997 |
| EP | 1016960 | 7/2000 |
| JP | 04253885 | 9/1992 |
| JP | 06180674 | 6/1994 |
| JP | 9244886 | 9/1997 |
| JP | 10069511 | 3/1998 |
| JP | 10133955 | 5/1998 |
| JP | 10222428 | 8/1998 |
| JP | 11143719 | 5/1999 |
| JP | 2000020795 | 1/2000 |
| JP | 2000227919 | 8/2000 |
| JP | 2000298689 | 10/2000 |
| JP | 2001169246 | 6/2001 |
| KR | 1998030143 | 7/1998 |
| KR | 1998033266 | 7/1998 |
| KR | 2000060715 | 10/2000 |
| WO | 00/63860 | 10/2000 |
| WO | 02/01333 | 1/2002 |

* cited by examiner

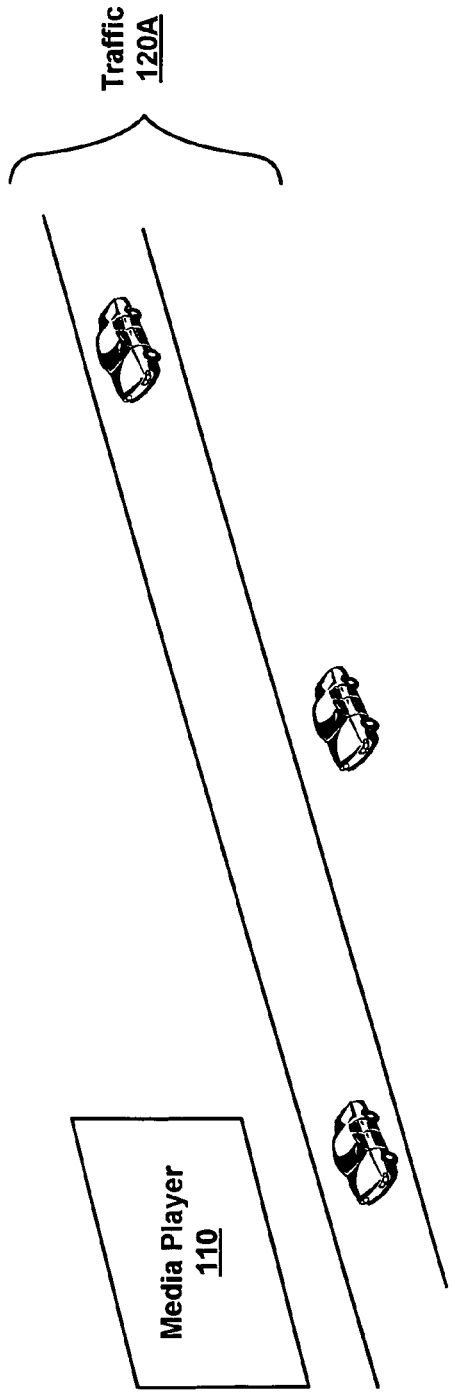
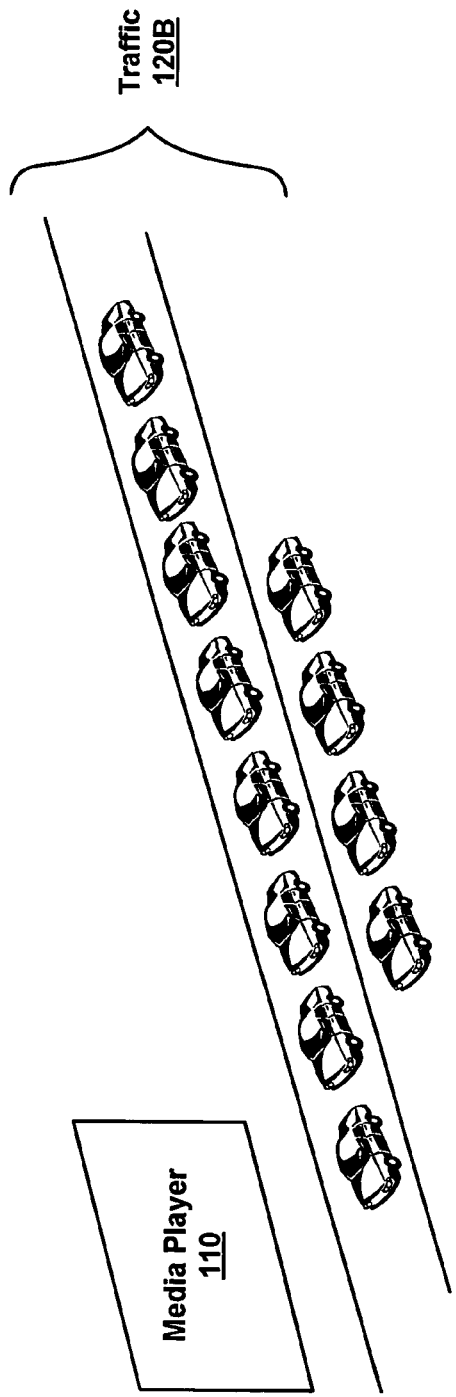

TRAFFIC-BASED MEDIA SELECTION

BACKGROUND OF THE INVENTION

1. Field of the Invention

The present invention generally relates to media selection. More specifically, the present invention relates to traffic-based media selection.

2. Description of Related Art

There are many types of media files. Media files may include static files (e.g., text and stationary graphics), dynamic files (e.g., video and/or audio), and various combinations of the foregoing. Such media files may be available in various formats and played on any variety of media players.

A media player may play multiple media files based on any variety of lists and/or based on direct user selection. For example, a playlist may be provided to the media player, which causes each media file to be played in the order provided. The playlist may be generated and based, at least in part, on one or more user selections, on a randomizing algorithm (e.g., shuffle), or a combination of the foregoing (e.g., random playback of a user's top ten selections). Alternatively, the media player may receive user selections one at a time.

Various types of media players may be used to expose one or more media files to an audience. For example, presently available billboards are capable of displaying various multimedia advertising to passing pedestrian and automobile traffic. Such advertising may include a series of different types of media files. Such media files may be played and/or displayed in a timed series. For example, a graphical display may be displayed for a minute, followed by a video played for a minute, followed by a second video played for a minute, and so forth. Each media file may be played in a predetermined series or may be played at random.

Such methods of media selection are not responsive to the changing conditions of the audience (i.e., the density or flow rate of the traffic). Unresponsiveness to changing traffic conditions may mean that various media files are not displayed to their best advantage, which may affect the effectiveness of advertising. Further, the unresponsive of a media display device with respect to traffic conditions may lead to risky or even dangerous situations. For example, a billboard playing an extremely dynamic media file (e.g., a high-definition video) before a quickly flowing stream of vehicular traffic may cause one or more individuals to become distracted, which may lead to traffic jams and even collisions. Similar risks may occur in the context of pedestrian traffic. There is, therefore, a need for improved methods for traffic-based media selection.

SUMMARY OF THE INVENTION

The present invention provides for methods and systems for traffic-based media selection. A first media file may be played on a media player. Traffic around the media player is monitored, and various traffic conditions, including speed and density of the traffic, may be detected. A second media file is selected based on a detected traffic condition and provided to the media player. In some embodiments of the present invention, the traffic may occur in a virtual environment.

Various embodiments of the present invention include methods for traffic-based media selection. Such methods may include selecting a first media file from a plurality of media files for play on a media player, receiving information regarding a detected traffic condition around the media player, selecting a second media file from the plurality of media files based on at least the received information concerning the detected traffic condition, and providing the selected second media file to the media player.

Further embodiments may include monitoring the traffic and detecting various traffic conditions, which may include traffic speed and traffic density. Where the detected traffic condition indicates increasing speed and/or decreasing density, the next selected media file may be more static than the current or previously selected media file. Where the detected traffic condition indicates decreasing speed and/or increasing density, the selected media file may be more dynamic. In some embodiments of the present invention, a second media file may be selected for play in conjunction with a first media file.

Still further embodiments of the present invention include systems for traffic-based media selection. Such systems may include a memory configured to store a plurality of media files for playing on a media player and a processor configured to select a media file from the plurality of media files based on a traffic condition detected by a sensor and to provide the media file to the media player. Some embodiments may further include the media player and one or more sensors for monitoring various aspects of traffic, including speed and density, for example.

Some embodiments of the present invention include computer-readable storage media having embodied thereon programs that, when executed by a processor or computing device, perform methods for traffic-based media selection.

BRIEF DESCRIPTION OF THE FIGURES

FIG. 1A illustrates a media player before an exemplary traffic condition.

FIG. 1B illustrates a media player before another exemplary traffic condition.

DETAILED DESCRIPTION

The present invention provides for methods and systems for traffic-based media selection. A media player may play a first media file before one or more streams of traffic. The traffic around the media player may be monitored, and various traffic conditions, including speed and density of the traffic, may be detected. A second media file is selected based on a certain detected traffic condition and provided to the media player. In some embodiments of the present invention, the traffic may occur in a virtual environment.

FIG. 1A illustrates a media player 110 before an exemplary traffic condition 120A. The traffic condition 120A illustrated in FIG. 1A includes only a few vehicles (i.e., low density). While vehicles are illustrated in FIG. 1A, traffic is also inclusive of foot traffic. Traffic may also be vehicular (ground based or airborne) or foot traffic in a virtual environment whereby a virtual billboard may display content before an audience of avatars, each controlled by a corresponding real-world user or computer intelligence.

Returning to FIG. 1A, low density allows for traffic to flow more quickly than when traffic is more dense. The vehicles in the illustrated traffic condition 120A, therefore, may be traveling past the media player 110 at high speeds. The speed at which a vehicle passes the media player affects how much of the media file an individual in one of the vehicles is able to see, hear, or otherwise experience.

A driver of one of the vehicles may become distracted, however, to varying degrees by the media file based on the type of media file and the static or dynamic nature of the media file. Distraction may cause the driver to slow down the vehicle, which may lead to traffic jams. Alternatively, the driver may drive at speeds that may be unsafe when distracted.

FIG. 1B illustrates the same media player 110 before another exemplary traffic condition 120B. The traffic condition 120B illustrated includes many vehicles (i.e., high density), and high density traffic generally moves at slower speeds than low density traffic. When traffic is moving slowly or is stationary before the media player, there is an opportunity to expose a media file to the various members of the traffic stream in a safe and effective manner. For example, an individual sitting in a traffic jam may have more time and attention to devote to appreciating a media file played by the media player 110. Further, more dynamic media files, which may require more attention, may be more safely played when traffic speeds are low.

Figure 2:
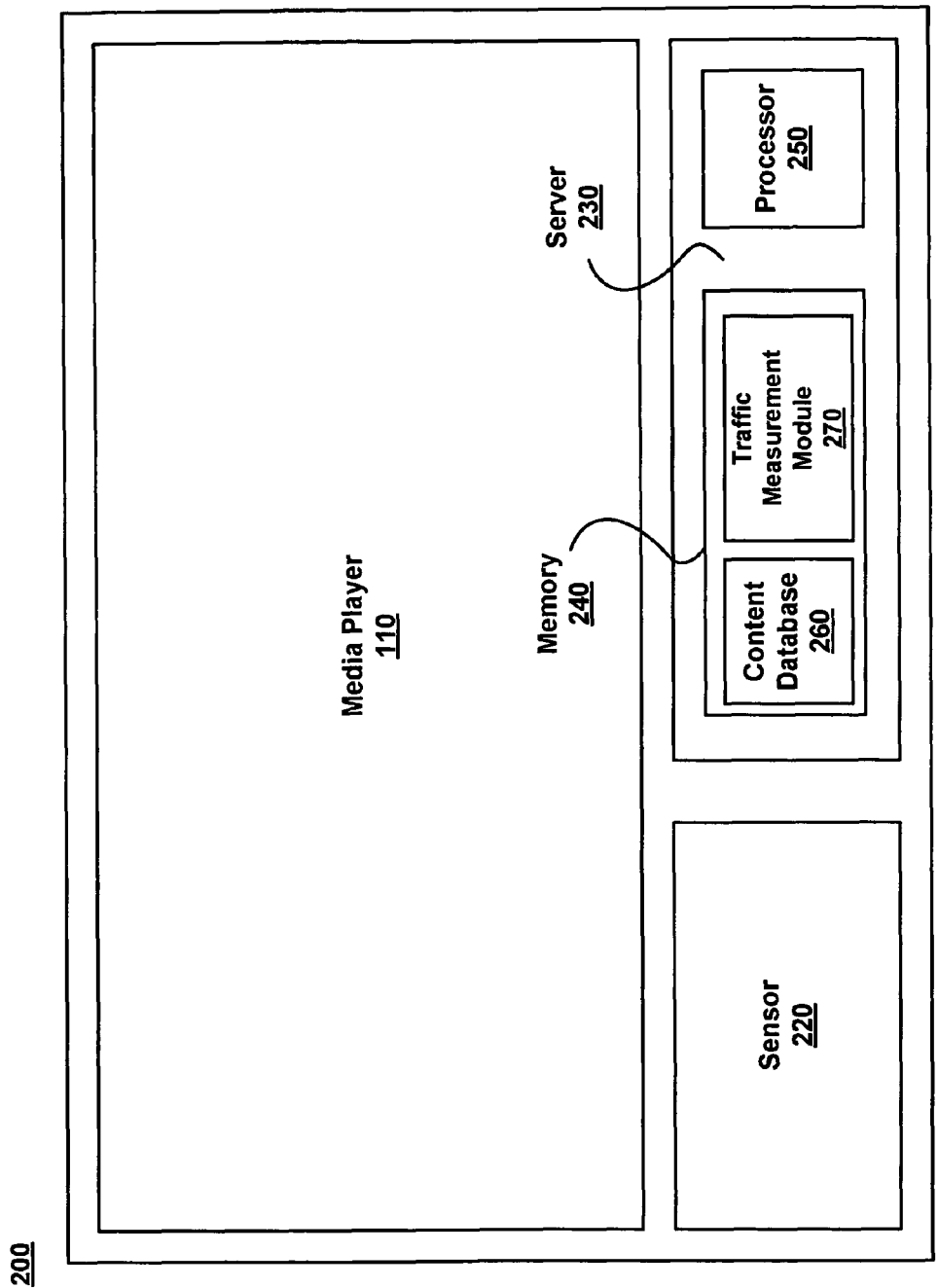
FIG. 2 is an exemplary system for traffic-based media selection.

FIG. 2 is an exemplary system 200 for traffic-based media selection. The system 200 may include a media player 110, one or more sensors 220 (for example, an array of sensors), and a media server 230. The server 230 may further include memory 240 and processor 250. Traffic may be monitored by sensors 220, and traffic flow and/or traffic density information may be provided to server 230 for analysis by traffic measurement module 270. Media files may be selected from a content database 260 maintained in memory 240 by processor 250. Selection of media files may be based on the traffic information provided by sensors 220 and analyzed through the execution of the traffic measurement module 270 by the processor 250. Following selection of media files from the content database 260, the content may be provided to media player 110 for display.

Media player 110 may include any number of programs, applications, hardware, software, and various combinations of the foregoing that are well-known in the art for playing one or more media files. Media files may be provided to media player 110 (via content database 260 where the actual files are stored) in accordance with a playlist, which may be designed by various users, administrators, or artificial intelligence. As discussed above, media files may include text files, graphics files, video files, audio files, and various combinations thereof. Playback or display of a media file may include presenting a display (in the instances of still-frame or single-frame content), video, and/or audio content.

Sensor 220 may include any of a variety of sensors with the ability to detect a variety of conditional and/or environmental information, including motion, speed, and population density. The number and types of sensors 220 included in the system 200 may vary depending on requirements or conditions of the area, the location and orientation of the media player, user requirements, and so forth. For example, a user may wish to monitor traffic density within a certain area around the media player 110. Depending on the capabilities of each sensor, monitoring a certain area may require multiple sensors at different locations around media player 110.

In some embodiments, sensors 220 may be embedded immediately proximate the media player 110 (for example, directly adjacent the display screen as a part of a display housing) or housed separately (in the case of remote sensors. Sensor 220 may be communicatively coupled to the system 200 and provide information to various other components of system 200. For example, upon sensing a conditional or environmental information (e.g., a traffic condition), the sensors 220 can provide information concerning such conditions to server 230 such that it may be processed and analyzed by the traffic measurement module 270.

Server 230 may include any of a variety of computing devices. In the case of server 230, the computing device is configured to select and provide content (e.g., media files) to the media player 110. Like sensor 220, server 230 may be integrated with media player 110 or housed separately. In the instance of server 230 being separately housing, the various components of server 230 may be communicatively coupled to and provide information to various other components of system 200.

In various embodiments of the present invention, server 230 may include a memory 240 and a processor 250. Memory 240 may include any type and/or combination of databases and software modules in addition to being generally configured for storing information. Memory 240 may reside on server 230 and be configured to store any of the variety of media files that may be played on media player 110. Such files may be stored in content database 260.

Content database 260 may be configured to allow for the indexing of content such that particular types of content (e.g., video) may be easily and quickly identified and retrieved by processor 250 for subsequent display via media player 110. Retrieval of content from content database 260 by processor 250 may occur in response to a particular piece of content having been identified on a playlist or through some other intelligent determination that may occur in response to the execution of the traffic measurement module 270.

Content may also be retrieved from the content database 260 in response to the need for content having a particular characteristic, which may be identified via metadata or storage in a particular hierarchy of the memory (e.g., with video only files or static text only files). Content generated and/or supplied by certain providers or that may be appropriate for certain contexts may also be indexed and retrieved as is appropriate based on any number of factors including traffic density and flow.

Traffic measurement module 270 is a software module that may be executed by processor 250 in response to data provided by sensor(s) 220. Measurement module may utilize data provided by sensors to determine traffic flow and density for a particular area, particular period of time, or any combination of the two. Utilizing this information, the traffic measurement module 270 may then determine what type of content may be appropriate for display for that particular traffic condition. For example, if the sensor data indicates that traffic is particularly heavy, the traffic measurement module 270 may determine that still-frame images or textual content may be best appropriate. Upon arriving at this determination, processor 250 will retrieve that content from content database 260 for subsequent display on the media player 110. Alternatively, the traffic measurement module 270 may utilize the data from sensor 220 to determine that traffic is particularly slow such that passers-by may devote additional attention to content. As such, the traffic measurement module 270 may indicate that it is appropriate for processor 250 to retrieve and provide for the display of video content from the content database 260.

The traffic measurement module 270 may be provided with any number of algorithms, metrics, or other measurement tools to determine what content should be played when and under what conditions. Traffic measurement module 270 may consider not only traffic density and flow but popularity of content, the last time content was played, temporal factors such as time of day, locale, responsiveness to the content (i.e., did traffic flow increase or slow in response to display of the content), and so on. Traffic measurement module 270 is reconfigurable or modifiable in response to the continued development of measurement techniques and/or the availability of particular content in content database 260.

Processor 250 may be configured to execute traffic measurement module 270 in memory 240 such that it may analyze received information from sensor 220 as it concerns various traffic conditions. Processor 250 is further configured to select a media file from content database 260 for play on media player 110 based on the detected traffic conditions and certain measurements and analyses undertaken by traffic measurement module 270. As discussed above, such detected traffic conditions may include motion, speed, population density, and so forth.

Figure 3:
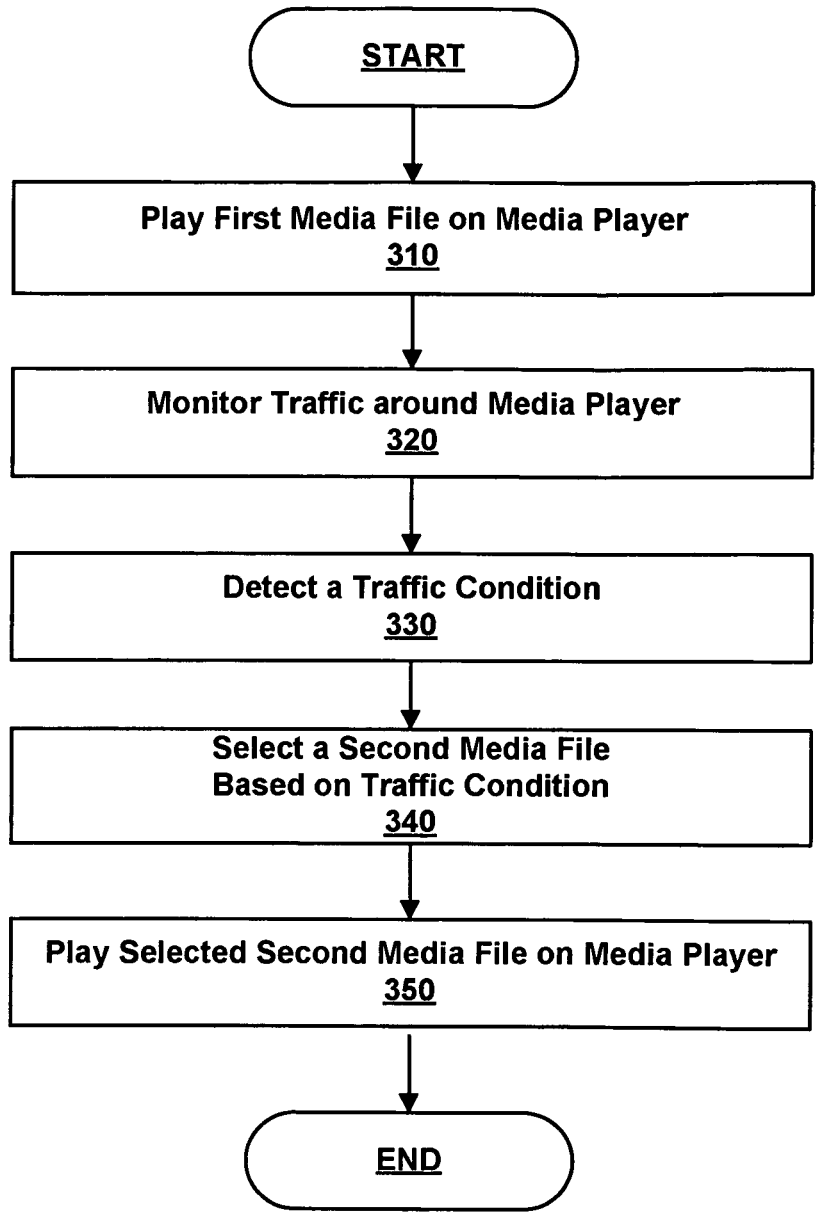
FIG. 3 is a flowchart illustrating an exemplary method for traffic-based media selection.

FIG. 3 is a flowchart illustrating an exemplary method 300 for traffic-based media selection. In the method 300, a first media file may be selected and played on the media player 110, while traffic around the media player 110 may be monitored by sensor 220. Such monitoring may result in a detected traffic condition as determined by the execution of the traffic measurement module 270 by processor 250 in response to information generated by sensor 220. A second media file may be selected based on the detected traffic condition. The selected second media file may then be provided to the media player 110 for playback:

In step 310, a first media file is selected and played on media player 110. A default media file or playlist of media files may be provided to and played by media player 110. The media files may include any combination of text, graphic, video, and/or audio files.

In step 320, traffic around the media player 110 is monitored by one or more sensors 220. Depending on various user or location specifications, sensors 220 may monitor multiple characteristics or conditions of traffic, including motion, speed, population density, and so forth. The sensors 220 may also be spaced in various configuration and locations so as to monitor traffic conditions in a certain area around the media player 110.

In step 330, a traffic condition (e.g., traffic condition 120A or 120B) is detected as a result of processor 250 executing traffic measurement module 270, which utilizes the monitoring information generated by sensors 220. Examples of traffic conditions may include a certain amount of motion, traffic speed, and/or traffic density. Sensors 220 can monitor and detect various possible combinations of such traffic conditions. Information concerning the traffic conditions may be provided periodically, automatically, and/or when certain traffic conditions are detected.

In step 340, a second media file is selected based on the traffic conditions detected in step 330. In some embodiments of the present invention, the information concerning the detected traffic conditions may be provided by sensors 220 to processor 250 residing on server 230. Based on the traffic information determined by execution of the traffic measurement module 270, processor 250 may select one or more media files. Processor 250 may generate a playlist of media files based on the traffic information provided.

In step 350, the selected second media file is provided to media player 110 for play. The first media file may be visual (i.e., text, graphics, video) and the second media file may be an audio file. The second media file may be selected for play in combination with the first media file in certain situations. For example, a user may wish for audio to be added to a visual display when a certain traffic density is detected. When traffic density is low, the media player 110 may display a visual media file without sound. As traffic density increases and a certain traffic density is detected, a second media file (i.e., an audio file) may be played such that the visual display is accompanied by sound.

Computer-readable storage media may be utilized to provide instructions to a central processing unit (CPU) for execution, including instructions that correspond to the methodology of FIG. 3. Such media can take many forms, including, but not limited to, non-volatile and volatile media such as optical or magnetic disks and dynamic memory. Common forms of computer-readable media also include a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge. Various forms of transmission media may be involved in carrying one or more sequences of one or more instructions to a CPU for execution.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive.

Further, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for traffic-based media selection, the method comprising:
    selecting a first media file from a plurality of media files for play on a media player;
    receiving information regarding a detected traffic condition around the media player;
    monitoring traffic comprising sensing a density of the traffic around the media player;
    selecting a second media file from the plurality of media files based on at least the received information concerning the detected traffic condition;
    wherein when the detected traffic condition is an increase in the density of the traffic, the selected second media file is more dynamic than the first media file;
    wherein when the detected traffic condition is a decrease in the density of the traffic, the selected second media file is more static than the first media file; and
    providing the selected second media file to the media player.

2. The method of claim 1, further comprising monitoring the traffic around the media player by detecting motion around the media player.

3. The method of claim 1, further comprising monitoring the traffic around the media player by sensing speed of the traffic around the media player.

4. The method of claim 3, wherein the detected traffic condition is an increase in the speed of the traffic and the selected second media file is more static than the first media file.

5. The method of claim 3, wherein the detected traffic condition is a decrease in the speed of the traffic and the selected second media file is less static than the first media file.

6. The method of claim 1, wherein the first media file is a video and the second media file is audio played in conjunction with the video.

7. The method of claim 1, wherein the traffic occurs in a virtual environment.

8. A system for traffic-based media selection, the system comprising:
   a memory configured to store a plurality of media files for playing on a media player; and
   a processor, wherein said processor:
   selects a first media file from a plurality of media files for play on a media player;
   receives information regarding a detected traffic condition from a sensor around the media player, the sensor being configured to monitor traffic conditions around the media player;
   selects a second media file from the plurality of media files based on at least the received information concerning the detected traffic condition;
      wherein when the sensor detects an increase in the speed of the traffic, the selected second media file is more static than the first media file;
      wherein when the sensor detects a decrease in the speed of the traffic, the selected second media file is more dynamic than the first media file; and provides the selected second media file to the media player.

9. The system of claim 8, further comprising the media player, the media player being configured to play the media file selected by the processor.

10. The system of claim 8, wherein the sensor is further configured to detect motion around the media player.

11. The system of claim 8, wherein the sensor is further configured to monitor a speed of the traffic around the media player.

12. The system of claim 8, wherein the sensor is further configured to monitor a density of the traffic around the media player.

13. The system of claim 12, wherein the sensor detects an increase in the density of the traffic and the media file selected by the processor is more dynamic than the previously selected first media file.

14. The system of claim 12, wherein the sensor detects a decrease in the density of the traffic and the media file selected by the processor is more static than the previously selected first media file.

15. The system of claim 8, wherein the first media file is a video and the second media file is audio played in conjunction with the video.

16. The system of claim 8, wherein the traffic occurs in a virtual environment.

17. A non-transitory computer-readable storage medium having embodied thereon a program, the program being executable by a computer processor to perform a method for traffic-based media selection, the method comprising:
   selecting a first media file from a plurality of media files for play on a media player;
   receiving information regarding a detected traffic condition around the media player;
   monitoring traffic comprising sensing a density of the traffic around the media player;
   selecting a second media file from the plurality of media files based on at least the received information concerning the detected traffic condition;
   wherein when the detected traffic condition is an increase in the density of the traffic, the selected second media file is more dynamic than the first media file;
   wherein when the detected traffic condition is a decrease in the density of the traffic, the selected second media file is more static than the first media file; and
   providing the selected second media file to the media player.

* * * * *